United States Patent [19]

Nagashima

[11] Patent Number: 5,698,608
[45] Date of Patent: Dec. 16, 1997

[54] MICROCELLULAR POLYURETHANE ELASTOMER

[75] Inventor: Tohoru Nagashima, Gifu, Japan

[73] Assignee: Polyurethane Chemical Co., Ltd., Tokyo, Japan

[21] Appl. No.: 719,067

[22] Filed: Sep. 24, 1996

Related U.S. Application Data

[62] Division of Ser. No. 404,759, Mar. 15, 1995, Pat. No. 5,585,413.

[30] Foreign Application Priority Data

| Mar. 17, 1994 | [JP] | Japan | 6-74446 |
| Jul. 27, 1994 | [JP] | Japan | 6-168875 |
| Oct. 26, 1994 | [JP] | Japan | 6-287513 |

[51] Int. Cl.$^6$ .................................................. C08G 18/04
[52] U.S. Cl. ........................ 521/159; 521/172; 521/173; 521/174
[58] Field of Search .................................. 521/159, 172, 521/173, 174

[56] References Cited

U.S. PATENT DOCUMENTS

| 4,569,982 | 2/1986 | Grögler et al. |
| 4,758,601 | 7/1988 | Haas et al. |
| 5,159,046 | 10/1992 | Grölger et al. |

FOREIGN PATENT DOCUMENTS

| 0358328 | 3/1990 | European Pat. Off. |
| 2409441 | 2/1974 | Germany |
| 1 950 98196-44 | 11/1996 | Germany |
| 46-38587 | 11/1971 | Japan |
| 52-54874 | 5/1977 | Japan |
| 55176066 | 6/1982 | Japan |
| 57-100121 | 6/1982 | Japan |
| 3124720 | 5/1991 | Japan |

OTHER PUBLICATIONS

"Concise Explanation" for JP-A-57-100121.

*Primary Examiner*—John M. Cooney, Jr.
*Attorney, Agent, or Firm*—Sughrue, Mion, Zinn, Macpeak & Seas, PLLC

[57] ABSTRACT

A microcellular polyurethane elastomer obtained by mixing an NCO-terminated prepolymer, an OH-terminated prepolymer and a foaming component with stirring to cause foaming and curing is disclosed, in which the NCO-terminated prepolymer is (A) a prepolymer obtained by reacting a polyester polyol (a) having a number average molecular weight of 1,000 to 3,000 and diphenylmethane-4,4'-diisocyanate (MDI) or (B) a partially crosslinked prepolymer obtained by further reacting the reaction product of polyester polyol (a) and MDI with a low-molecular weight polyol, the OH-terminated prepolymer is (A) a prepolymer obtained by reacting polyester polyol (a) with a polyisocyanate or (B) a prepolymer obtained by reacting polyester polyol (b) and/or a polyether polyol both having a number average molecular weight of 500 to 3,000 with a polyisocyanate, and the foaming component contains water as a main blowing agent, which elastomer exhibits improved resistance to fatigue failure and permanent set in a fatigue test while retaining advantages of the use of MDI.

7 Claims, 2 Drawing Sheets

MICROCELLULAR POLYURETHANE ELASTOMER

This is a divisional of application No. 08/404,759 filed Mar. 15, 1996 now U.S. Pat. No. 5,585,413.

FIELD OF THE INVENTION

This invention relates to a microcellular polyurethane elastomer which has a relatively low foaming ratio and is composed of fine cells and a process for producing the same. The microcellular polyurethane elastomer (hereinafter sometimes referred to as elastomer) of the present invention has high mechanical strength and, when a high load is repeatedly imposed thereon, exhibits excellent kinetic properties, particularly resistance against fatigue failure or permanent set, and is therefore useful as, for example, a cushion material for an auxiliary spring of automobiles.

BACKGROUND OF THE INVENTION

Microcellular polyurethane elastomers have been used as a vibration isolation material, a shock absorber, etc. They have conventionally been obtained by a process comprising reacting a polyester polyol having a number average molecular weight of 1,000 to 3,000 which is obtained by polycondensation between at least one alkylene oxide (e.g., ethylene oxide, propylene oxide or 1,4-butylene oxide) adduct of a polyol (e.g., ethylene glycol, propylene glycol, 1,4-butylene glycol, glycerin or trimethylolpropane) and at least one organic acid (e.g., malonic acid, maleic acid, adipic acid or terephthalic acid) with a polyisocyanate, e.g., 2,4-tolylene diisocyanate (2,4-TDI), 2,6-tolylene diisocyanate (2,6-TDI), a mixture of 2,4-TDI and 2,6-TDI, diphenylmethane-4,4'-diisocyanate (MDI), naphthylene-1,5-diisocyanate (NDI) or 3,3'-dimethyl-4,4'-biphenylene diisocyanate (TODI) to obtain an isocyanate (NCO)-terminated prepolymer and reacting the NCO-terminated prepolymer with a foaming component comprising water, a catalyst, a foam stabilizer, etc. while stirring (cf., unexamined published Japanese patent application No. 57-100121).

Of the elastomers obtained by the above process, those prepared by using NDI as a polyisocyanate component are excellent in mechanical strength and durability under repeated high loads, such as resistance to fatigue failure or permanent set, and are therefore useful as a cushion material for an auxiliary spring of automobiles. However, NDI is expensive because it is produced chiefly for use as an intermediate material for synthesizing pharmaceuticals, dyes, etc. on a relatively small scale with a narrow market. Further, the NCO-terminated prepolymer obtained by the reaction between a polyester polyol and NDI has a short pot life and poor workability in mixing with a foaming component for molding and curing due to its high viscosity. On the other hand, MDI, which is a general-purpose polyisocyanate compound, is inexpensive, and the NCO-terminated prepolymer obtained by using MDI has a low viscosity, exhibiting satisfactory workability in foaming and curing as well as a long pot life. However, a polyurethane elastomer prepared from this NCO-terminated prepolymer has insufficient mechanical strength and insufficient durability.

SUMMARY OF THE INVENTION

An object of the present invention is to overcome the above-mentioned disadvantages of conventional microcellular polyurethane elastomers. That is, the object of the present invention is to provide an NCO-terminated prepolymer having a low viscosity and an extended pot life by using inexpensive MDI, to provide an elastomer equal to that prepared by using NDI in mechanical strength and durability, and to provide a process for producing such an elastomer.

A first embodiment of the present invention relates to a microcellular polyurethane elastomer which is obtained by mixing an NCO-terminated prepolymer, a hydroxyl (OH)-terminated prepolymer and a foaming component with stirring to cause foaming and curing, in which the NCO-terminated prepolymer is a prepolymer obtained by reacting a polyester polyol having a number average molecular weight of 1,000 to 3,000 (hereinafter designated polyester polyol (a)) and MDI at a weight ratio of from 1:0.2 to 0.6 (hereinafter designated NCO-terminated prepolymer (A)), the OH-terminated prepolymer is a prepolymer obtained by reacting polyester polyol (a) with a polyisocyanate at a molar ratio of from 1:0.05 to 0.5 (hereinafter designated OH-terminated prepolymer (A)), and the foaming component contains water as a main blowing agent.

A second embodiment of the present invention relates to the elastomer according to the first embodiment, in which the polyisocyanate is TODI.

A third embodiment of the present invention relates to the elastomer according to the first embodiment, in which the OH-terminated prepolymer (A) is used in an amount of from 0.1 to 1.0 part by weight per 100 parts by weight of the polyester polyol (a).

A fourth embodiment of the present invention relates to the elastomer according to the first embodiment, in which NCO-terminated prepolymer (A) has a viscosity of not higher than 2,500 cp, and the elastomer exhibits a fatigue life of not less than 500,000 and permanent set of not more than 10% in a fatigue test in which a load of 5 kN is repeatedly applied to a test piece at a frequency of 2 Hz, the fatigue life being the number of cycles of repeated loading required for a break, and the permanent set (S) being obtained by equation:

$$S(\%) = (h_0 - h)/h_0 \times 100$$

wherein $h_0$ is the height of a test piece before a fatigue test; and h is the height of the test piece after 500,000 cycles of repeated loading in the test.

A fifth embodiment of the present invention relates to a microcellular polyurethane elastomer which is obtained by mixing an NCO-terminated prepolymer, an OH-terminated prepolymer and a foaming component with stirring to cause foaming and curing, in which the NCO-terminated prepolymer is a prepolymer obtained by reacting polyester polyol (a) and MDI at a weight ratio of from 1:0.2 to 0.6, and reacting 100 parts by weight of the resulting reaction product with from 0.1 to 2.0 parts by weight of a low-molecular weight polyol (hereinafter designated NCO-terminated prepolymer (B)), the OH-terminated prepolymer is a prepolymer obtained by reacting a polyester polyol having a number average molecular weight of 500 to 3,000 (hereinafter designated polyester polyol (b)) and/or a polyether polyol having a number average molecular weight of 500 to 3,000 with a polyisocyanate at a molar ratio of from 1:0.05 to 0.5 (hereinafter designated OH-terminated prepolymer (B)), and the foaming component contains water as a main blowing agent.

A sixth embodiment of the present invention relates to the elastomer according to the fifth embodiment, in which the polyisocyanate is at least one compound selected from TODI, NDI, 2,4-TDI, 2,6-TDI, and a mixture of 2,4-TDI and 2,6-TDI.

A seventh embodiment of the present invention relates to the elastomer according to the fifth embodiment, in which the OH-terminated prepolymer (B) is used in an amount of from 0.1 to 1.0 part by weight per 100 parts by weight of the polyester polyol (a).

An eighth embodiment of the present invention relates to the elastomer according to the fifth embodiment, in which the elastomer exhibits a fatigue life of not less than 500,000 and permanent set of not more than 10% in a fatigue test in which a load of 5 kN is repeatedly applied to a test piece at a frequency of 2 Hz, the fatigue life being the number of cycles of repeated loading required for a break, and the permanent set (S) being obtained by equation:

$$S(\%) = (h_0 - h)/h_0 \times 100$$

wherein $h_0$ is the height of a test piece before a fatigue test; and h is the height of the test piece after 500,000 cycles of repeated loading in the test.

A ninth embodiment of the present invention relates to the elastomer according to the fifth embodiment, in which the NCO-terminated prepolymer has a pot life of 4 hours or longer, the pot life being defined as the limit of time until which non-defective elastomers could be obtained without suffering from abnormality, such as cracks or blisters, at the time of demolding.

A tenth embodiment of the present invention relates to a process for producing a microcellular polyurethane elastomer comprising reacting polyester polyol (a) and MDI at a weight ratio of from 1:0.2 to 0.6, reacting 100 parts by weight of the resulting reaction product with from 0.1 to 2.0 parts by weight of a low-molecular weight polyol to obtain partially crosslinked NCO-terminated prepolymer (B), and mixing and reacting the NCO-terminated prepolymer (B), OH-terminated prepolymer (B) obtained by reacting polyester polyol (b) and/or a polyether polyol having a number average molecular weight of 500 to 3,000 with a polyisocyanate at a molar ratio of from 1:0.05 to 0.5, and a foaming component containing water as a main blowing agent while stirring.

An eleventh embodiment of the present invention relates to the process according to the tenth embodiment, in which the polyisocyanate is at least one compound selected from TODI, NDI, 2,4-TDI, 2,6-TDI, and a mixture of 2,4-TDI and 2,6-TDI.

A twelfth embodiment of the present invention relates to the process according to the tenth embodiment, in which the OH-terminated prepolymer (B) is used in an amount of from 0.1 to 1.0 part by weight per 100 parts by weight of the polyester polyol (a).

DETAILED DESCRIPTION OF THE INVENTION

Figure 1:
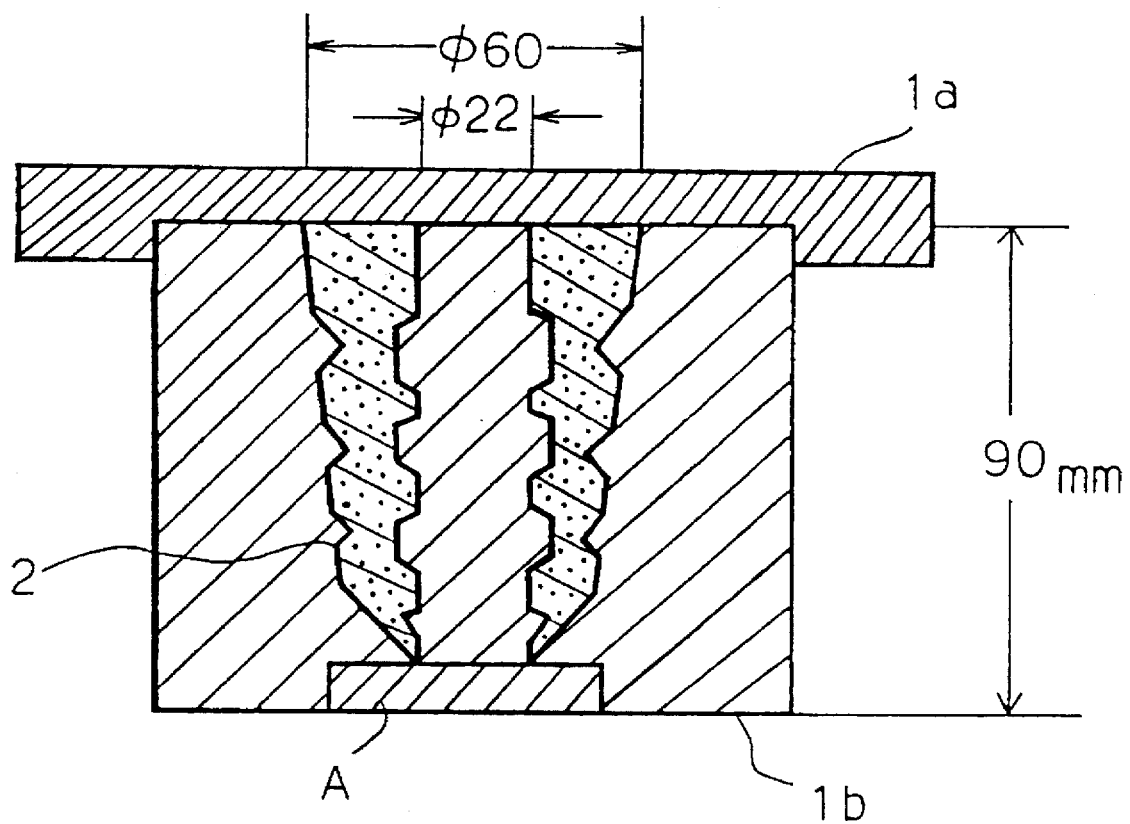
FIG. 1 is a cross section of a mold and a molded article which are used for observing and evaluating development of cracks or blisters of a polyurethane elastomer at the time of demolding.

Polyester polyol (a) which can be used in the present invention includes those obtained by polycondensation between at least one alkylene oxide (e.g., ethylene oxide, diethylene oxide, propylene oxide or 1,4-butylene oxide) adduct of a polyol (e.g., ethylene. glycol, diethylene glycol, propylene glycol, 1,4-butylene glycol, glycerin or trimethylolpropane) and at least one organic acid, such as malonic acid, maleic acid, adipic acid or terephthalic acid. Polyester polyol (a) has a number average molecular weight of 1,000 to 3,000. In particular, polyester polyol (a) having a number average molecular weight between 1,500 and 2,500 exhibits smooth progress in reacting with a polyisocyanate, and such a molecular chain length is suitable for withstanding repeated mechanical fatigue.

Polyester polyol (a) to be used in the elastomer according to the fifth embodiment of the present invention includes not only the above-mentioned condensation type polyester polyols but non-condensation type polyester polyols, such as polycaprolactone polyester polyol or polycarbonate polyester polyol. These polyester polyols, whether of condensation type or non-condensation type, may be used either individually or as a mixture of two or more thereof.

MDI to be used in the present invention is pure MDI. Containing two functional groups per molecule, pure MDI, on reacting with polyester polyol (a), provides NCO-terminated prepolymer (A) or a precursor of NCO-terminated prepolymer (B) (in the present invention mostly referred to as a reaction product of polyester polyol (a) and MDI) each having a chain structure, from which an elastomer with excellent durability can be obtained. If an MDI species other than pure MDI, such as crude MDI or carbodiimide-modified MDI, which contains 2 to 3 functional groups in average per molecule, is used, the resulting NCO-terminated prepolymer (A) or precursor of NCO-terminated prepolymer (B) contains disordered network structure, which will provide an elastomer having low elongation and, in particular, poor durability such as poor resistance to fatigue failure under repeated loading of a high load.

NCO-Terminated prepolymer (A) which can be used in the present invention is obtained by reacting polyester polyol (a) and MDI at a weight ratio of 1:0.2 to 1:0.6. If the weight ratio of MDI to polyol is less than 0.2, a free MDI content in the resulting prepolymer (A) is insufficient so that the reaction system for preparation of NCO-terminated prepolymer (A) has an increased viscosity to reduce the workability. If it exceeds 0.6, the resulting NCO-terminated prepolymer (A) will have too high a free MDI content. It follows that the prepolymer (A) exhibits a high rate of reaction with a blowing agent only to provide an elastomer having non-uniform cell diameter and shape and reduced mechanical strength and durability.

NCO-Terminated prepolymer (B) is obtained by reacting polyester polyol (a) with MDI at a weight ratio of from 1:0.2 to 1:0.6 and further reacting the reaction product with a low-molecular weight polyol. If the weight ratio of MDI to polyester polyol (a) is less than 0.2 or more than 0.6, the same disadvantages as described above with respect to NCO-terminated prepolymer (A) result. A preferred weight ratio of MDI to polyester polyol (a) is from 0.3 to 0.5, at which workability in the preparation of prepolymer (B) and durability of the resulting elastomer are particularly excellent.

The low-molecular weight polyol which can be used in the preparation of NCO-terminated prepolymer (B) includes short-chain and low-molecular weight alkylene polyols having 2 or 3 active hydrogen groups, such as ethylene glycol, propylene glycol, 1,4-butylene glycol, 1,5-pentamethylene glycol, 1,6-hexamethylene glycol, and trimethylolpropane. The low-molecular weight polyol is added in an amount of from 0.1 to 2.0 parts by weight per 100 parts by weight of the reaction product of polyester polyol (a) and MDI. While the reaction product as obtained may contain small amounts of unreacted polyester polyol (a) and/or unreacted MDI, the total charged amount of polyester polyol (a) and MDI is taken as 100 parts by weight.

If the low-molecular weight polyol is used in an amount less than 0.1 part by weight, it fails to provide the resulting NCO-terminated prepolymer (B) with a substantial crosslinked structure. If the amount of the low-molecular weight polyol exceeds 2.0 parts by weight, the resulting prepolymer (B) has an increased hard segment content only to provide an elastomer with reduced softness and deteriorated durability. Additionally, the viscosity of the prepolymer increases to reduce the workability. A preferred amount of the low-molecular weight polyol ranges from 0.3 to 1.5 parts by weight, in which range the resulting prepolymer has a moderate degree of crosslinking and provides an elastomer with particularly excellent durability.

The polyisocyanate which can be used in the preparation of OH-terminated prepolymer (A) is not particularly limited and includes TODI, 2,4-TDI, 2,6-TDI, a mixture of 2,4-TDI and 2,6-TDI, MDI, NDI, etc. TODI is especially preferred for obtaining an elastomer with further improved durability. Polyester polyol (a) which can be used in the preparation of OH-terminated prepolymer (A) may be either the same as or different from that used in the preparation of NCO-terminated prepolymer (A).

OH-Terminated prepolymer (A) can be obtained by reacting 1 mol of polyester polyol (a) with 0.05 to 0.5 mol of a polyisocyanate while stirring. If the molar ratio of the polyisocyanate to the polyol (a) is less than 0.05, the resulting elastomer would have reduced heat resistance and deteriorated durability. If it exceeds 0.5, OH-terminated prepolymer (A) has its viscosity increased with the molar ratio of the polyisocyanate approaching 1, tending to undergo phase separation due to reduced water-miscibility when mixed with other chain extender. Moreover, the reaction with NCO-terminated prepolymer (A) is non-uniform only to provide an elastomer with reduced heat resistance.

OH-Terminated prepolymer (A) is used in an amount of from 0.1 to 1.0 part by weight per 100 parts by weight of polyester polyol (a) used for the formation of NCO-terminated prepolymer (A). If the amount of OH-terminated prepolymer (A) is less than 0.1 part by weight, the content of the polyisocyanate, e.g., TODI, based on the total reaction mixture is too low to provide an elastomer having satisfactory heat resistance and durability. If OH-terminated prepolymer (A) is used in an amount exceeding 1.0 part by weight, it fails to be mixed with water uniformly. It follows that the reaction with NCO-terminated prepolymer (A) is non-uniform only to provide an elastomer having reduced durability. Besides, the elastomer becomes unfavorably hard with an increase in polyisocyanate (e.g., TODI) content.

Polyester polyol (b) and/or a polyether polyol which can be used in the preparation of OH-terminated prepolymer (B) are polyols having a number average molecular weight of 500 to 3,000. Polyester polyol (b) may be selected from polyester polyols (a) or other polyester polyols as far as the specific molecular weight requirement is met. A preferred number average molecular weight of polyester polyol (b) and/or a polyether polyol is in the range of from 1,000 to 2,500, in which the resulting OH-terminated prepolymer (B) shows excellent dispersibility with a foaming component and provides an elastomer having excellent durability.

The polyether polyol to be used is not particularly limited and can be selected from those generally employed for elastomer formulation as long as the molecular weight requirement is fulfilled. Examples of suitable polyether polyols include general polyether polyols prepared by chain extension of a polyhydric alcohol (e.g., ethylene glycol, propylene glycol, trimethylolpropane, triethanolamine, pentaerythritol or ethylenediamine) using an alkylene oxide (e.g., ethylene oxide or propylene oxide); polymer polyols; and modified polyols, such as amine-modified polyols.

Polyester polyols (b) or the above-described polyether polyols may be used either individually or as a mixture of two or more thereof. One or more polyester polyols (b) and one or more polyether polyols may be used in combination.

Polyester polyol (b) to be used in the elastomer according to the fifth embodiment of the present invention includes not only the above-mentioned condensation type polyester polyols but non-condensation type polyester polyols, such as polycaprolactone polyester polyol or polycarbonate polyester polyol. These polyester polyols, whether of condensation type or non-condensation type, may be used either individually or as a mixture of two or more thereof.

A preferred number average molecular weight of the polyether polyol is also in the range of from 1,000 to 2,500, in which the same effects as described above with respect to polyester polyol (b) are produced.

The polyisocyanate which can be used in the preparation of OH-terminated prepolymer (B) is not particularly limited and include TODI, 2,4-TDI, 2,6-TDI, a mixture of 2,4-TDI and 2,6-TDI, MDI, NDI, etc. TODI, NDI, and 2,4-and/or 2,6-TDI are especially preferred for obtaining an elastomer with further improved durability.

OH-Terminated prepolymer (B) can be obtained by reacting 1 mol of polyester polyol (b) and/or a polyether polyol with 0.05 to 0.5 mol of a polyisocyanate. If the molar ratio of the polyisocyanate to the polyol is less than 0.05, the polyisocyanate content is too low to assure satisfactory heat resistance, mechanical strength and durability. If it exceeds 0.5, the resulting OH-terminated prepolymer (B) has an increased viscosity and insufficient water-miscibility, tending to undergo phase separation. Further, the reaction with NCO-terminated prepolymer (B) becomes non-uniform, and the resulting elastomer has reduced durability. A preferred molar ratio of the polyisocyanate to the polyol is in the range of from 0.1 to 0.4, in which the resulting elastomer exhibits particularly excellent heat resistance.

OH-Terminated prepolymer (B) is preferably used in an amount of from 0.1 to 1.0 part by weight per 100 parts by weight of polyester polyol (a) used in the preparation of NCO-terminated prepolymer (B). If the amount of OH-terminated prepolymer (B) is less than 0.1 part by weight, the proportion of the polyisocyanate, e.g., TODI, based on the total reaction mixture is low, tending to provide an elastomer having insufficient heat resistance and durability. If OH-terminated prepolymer (B) is used in an amount exceeding 1.0 part by weight, the reaction with NCO-terminated prepolymer (B) tends to become non-uniform due to reduced water-dispersibility only to provide an elastomer having reduced heat resistance and durability. Besides, the elastomer becomes unfavorably hard with an increase in polyisocyanate (e.g., TODI) content. A preferred amount of OH-terminated prepolymer (B) is from 0.3 to 0.8 part by weight per 100 parts by weight of polyester polyol (a), at which the OH-terminated prepolymer (B) exhibits satisfactory water-dispersibility to provide an elastomer with further improved performance properties.

The foaming component which can be used in the present invention comprises water as a main blowing agent, a catalyst (e.g., an amine type catalyst, such as triethylenediamine, triethylamine, dimethylethanolamine and N,N,N',N'-tetramethylpropylenediamine, stannous octoate, and dibutyltin lauate), a foam stabilizer (e.g., a silicone type foam stabilizer, such as dimethylpolysiloxane-polyoxyalkylene copolymer), and the like. While not limiting, the proportion of the weight of water, which serves as not only a blowing agent but a crosslinker, based on the total reaction mixture is preferably 0.5 or higher; for, at this proportion, the resulting elastomer has a network structure in which molecules are regularly aligned and exhibits high mechanical strength and excellent durability under repeated loading of a high load, such as resistance of fatigue failure or permanent set.

The process for producing a microcellular polyurethane elastomer according to the present invention comprises reacting polyester polyol (a) and MDI at a weight ratio of from 1:0.2 to 0.6, reacting 100 parts by weight of the resulting reaction product with from 0.1 to 2.0 parts by weight of a low-molecular weight polyol to obtain partially crosslinked NCO-terminated prepolymer (B) and mixing and reacting the NCO-terminated prepolymer (B), OH-terminated prepolymer (B) obtained by reacting polyester polyol (b) and/or a polyether polyol having a number average molecular weight of 500 to 3,000 with a polyisocyanate at a molar ratio of from 1:0.05 to 0.5, and a foaming component containing water as a main blowing agent while stirring.

The above-mentioned process of the present invention is characterized in that (1) a reaction product of polyester polyol (a) and MDI is reacted with a low-molecular weight polyol before addition of OH-terminated prepolymer (B) and a foaming component (in other words, in the absence of a blowing agent) to prepare NCO-terminated prepolymer (B) having a partially crosslinked structure and (2) the thus prepared NCO-terminated prepolymer (B) is then combined with OH-terminated prepolymer (B) and a foaming component mainly comprising water as a blowing agent.

NCO-Terminated prepolymer (B), OH-terminated prepolymer (B), and the foaming component are used as such a mixing ratio that a ratio of the isocyanate equivalent of NCO-terminated prepolymer (B) to the total hydroxyl equivalent of OH-terminated prepolymer (B) and the foaming component ranges from 0-9 to 1.2. If desired, other secondary agents may be used in combination. Suitable secondary agents include various liquid flame retardants and diluents for facilitating mixing by stirring; antioxidants, ultraviolet absorbents, colorants; and other additives. The amounts of these secondary agents to be added are not particularly limited as long as the performance properties of the resulting elastomer are not significantly impaired.

In the present invention, MDI which is inexpensive and contributes to workability in the production of the elastomer is employed as a component for preparing an NCO-terminated prepolymer. It is known that conventional elastomers prepared by using MDI have poor durability particularly under repeated high loading. In the present invention, the combination of NCO-terminated prepolymer (A), OH-terminated prepolymer (A), and a foaming component containing water as a main blowing agent compensates for the slight inferiority of MDI-based elastomer in heat resistance. When, in particular, a highly heat-resistant polyisocyanate, such as TODI, is used as a component for preparing OH-terminated prepolymer (A), the resulting elastomer exhibits, in spite of the use of MDI, excellent performance properties equal to those of an elastomer obtained from an NCO-terminated prepolymer which is prepared by using NDI as a polyisocyanate in a fatigue test accompanied by heat generation.

Further, when the reaction product of polyester polyol (a) and MDI is reacted with a small amount of a low-molecular weight polyol prior to adding water as crosslinker as well as a blowing agent, part of the molecules of said reaction product undergo crosslinking reaction to form NCO-terminated prepolymer (B) with internally reinforced structure. The combination of NCO-terminated prepolymer (B) and OH-terminated prepolymer (B), especially the one prepared by using a highly heat-resistant polyisocyanate, such as TODI, provides an elastomer exhibiting excellent durability, in spite of the use of MDI, equal to that obtained in the case of using an NCO-terminated prepolymer prepared by using NDI as a polyisocyanate.

The present invention will now be illustrated in greater detail with reference to Examples and Comparative Examples, but it should be understood that the present invention is not limited thereto.

(I) Starting Materials:
  (a) Polyisocyanate:
    (1) Pure MDI:
      Millionate MT, a trade name, produced by Nippon Polyurethane industry Co., Ltd.
    (2) NDI:
      Cosmonate ND, a trade name, produced by Mitsui Toatsu Chemicals, Inc.
  (b) Polyester Polyol:
    (1) Polyethylene adipate polyester polyol:
      ODX-102, a trade name, produced by Dainippon Ink and Chemicals, Inc.; number average molecular weight: 2,000; hydroxyl value: 56
    (2) Poly(ethylene/butylene) adipate polyester polyol:
      ODX-105, a trade name, produced by Dainippon Ink and Chemicals, Inc.; number average molecular weight: 2,000; hydroxyl value: 56
    (3) Polyethylene adipate polyester polyol:
      ODX-286, a trade name, produced by Dainippon Ink and Chemicals, Inc.; number average molecular weight: 1,000; hydroxyl value: 112
    (4) Polycaprolactone polyester polyol:
      PLACCEL 220N, a trade name, produced by Daicel Chemical Industries, Ltd.; number average molecular weight: 2,000; hydroxyl value: 56
    (5) Polycarbonate polyester polyol:
      PLACCEL CD-220HL, a trade name, produced by Daicel Chemical Industries, Ltd.; number average molecular weight: 2,000; hydroxyl value: 56
  (c) Polyether Polyol:
    (1) Polytetramethylene glycol:
      PTMG-2000, a trade name, produced by Sanyo Chemical Industries, Ltd.; number average molecular weight: 2,000; hydroxyl value: 56
  (d) Low-Molecular Weight Polyol:
    (1) Ethylene glycol:
      A product of Nisso Yuka Kogyo K.K.; molecular weight: 62; hydroxyl value: 1,808
    (2) 1,4-Butylene glycol:
      A product of BASF; molecular weight: 90; hydroxyl value: 1,245
  (e) OH-Terminated Prepolymer:
    (1) Prepolymer obtained by reacting polyester polyol (1) described above and TODI at a molar ratio of 1:0.3.
    (2) Prepolymer obtained by reacting polyester polyol (2) described above and TODI at a molar ratio of 1:0.3.
    (3) Prepolymer obtained by reacting polyester polyol (1) described above and TODI at a molar ratio of 1:0.4.

(4) Prepolymer obtained by reacting polyester polyol (3) described above and TODI at a molar ratio of 1:0.4.
(5) Prepolymer obtained by reacting polyester polyol (4) described above and TODI at a molar ratio of 1:0.3.
(6) Prepolymer obtained by reacting polyester polyol (5) described above and TODI at a molar ratio of 1:0.3.
(7) Prepolymer obtained by reacting polyether polyol (1) described above and TODI at a molar ratio of 1:0.3.

TODI used in OH-terminated prepolymers (1) to (7) was "TODI", a trade name of Nippon Soda Co., Ltd.

(f) Blowing Agent:

Additive SM, a trade name of a mixture mainly comprising water, produced by Sumitomo Bayer Co., Ltd.

(g) Catalyst:

DABCO 33LV, a trade name, produced by Sankyo Air Products Co., Ltd.; main component: triethylenediamine (h) Foam Stabilizer:

SF-2962, a trade name of a silicone type foam stabilizer, produced by Toray Dow Corning Silicone Co., Ltd.

(II) Measurement of Physical Properties:

Microcellular polyurethane elastomers produced were tested according to the following test methods.

(a) Density:

The weight of a test piece (120×100×3 mm) was divided by its volume.

(b) Tensile Strength and Elongation at Break:

Measured in accordance with JIS K-6301 using a No. 3 test piece; rate of pulling: 500 mm/min.

(c) Tear Strength:

Measured in accordance with JIS K-6301 using a B type test piece; rate of pulling: 500 mm/min.

(d) Viscosity of NCO-Terminated Prepolymer:

Measured with a Brookfield rotational viscometer manufactured by Tokimec Inc.; rotational speed of rotor: 30 rpm; rotor No.: 3; measuring temperature: 80° C.

(e) Durability (fatigue life):

A load of 5 kN was repeatedly applied to a test piece at a frequency of 2 Hz, and the number of cycles of repeated loading required for reaching a break was taken as a fatigue life. A test piece which is not broken even when the load is applied 500,000 cycles is regarded excellent.

(f) Permanent set (S):

Obtained according to equation:

$$S(\%) = (h_0 - h)/h_0 \times 100$$

wherein $h_0$ is the height of a test piece before the above-described fatigue test; and h is the height of the test piece after 500,000 cycles of repeated loading in the test.

(g) Pot Life of NCO-Terminated Prepolymer:

An elastomer was molded using an NCO-terminated prepolymer at a time interval of from 30 to 60 minutes from the preparation of the prepolymer. The pot life of the prepolymer was expressed in terms of the limit of time until which non-defective elastomers could be obtained without suffering from abnormality, such as cracks or blisters, at the time of removal from the mold (demolding).

While molding and demolding the elastomers according to the present invention may be carried out under broad conditions, the above-mentioned pot life was decided from whether or not non-defectives were obtained under conditions (i) to (v) described below (the conditions shown in the parentheses are those actually employed in Examples and Comparative Examples). Use of an NCO-terminated prepolymer having a pot life of 4 hours or longer as measured under these conditions would provide elastomers with ensured excellent properties.

(i) NCO-terminated prepolymer temperature: 60° to 100° C. (90° C.)

(ii) Reaction mixture temperature: 40° to 60° C. (55° C.)

(iii) Mold surface temperature: 60° to 100° C. (90° C.)

(iv) Curing temperature: 90° to 120° C. (100° C.)

(v) Time required to demold: 25 to 40 min (30 min)

Cracks or blisters of elastomers obtained were evaluated as follows.

(1) Cracks:

A mold of the shape and size shown in FIG. 1 was used for molding. At the time of demolding, cracks were observed with the naked eye. A molded article 2 having even a small crack was regarded a rejected article.

Figure 2:
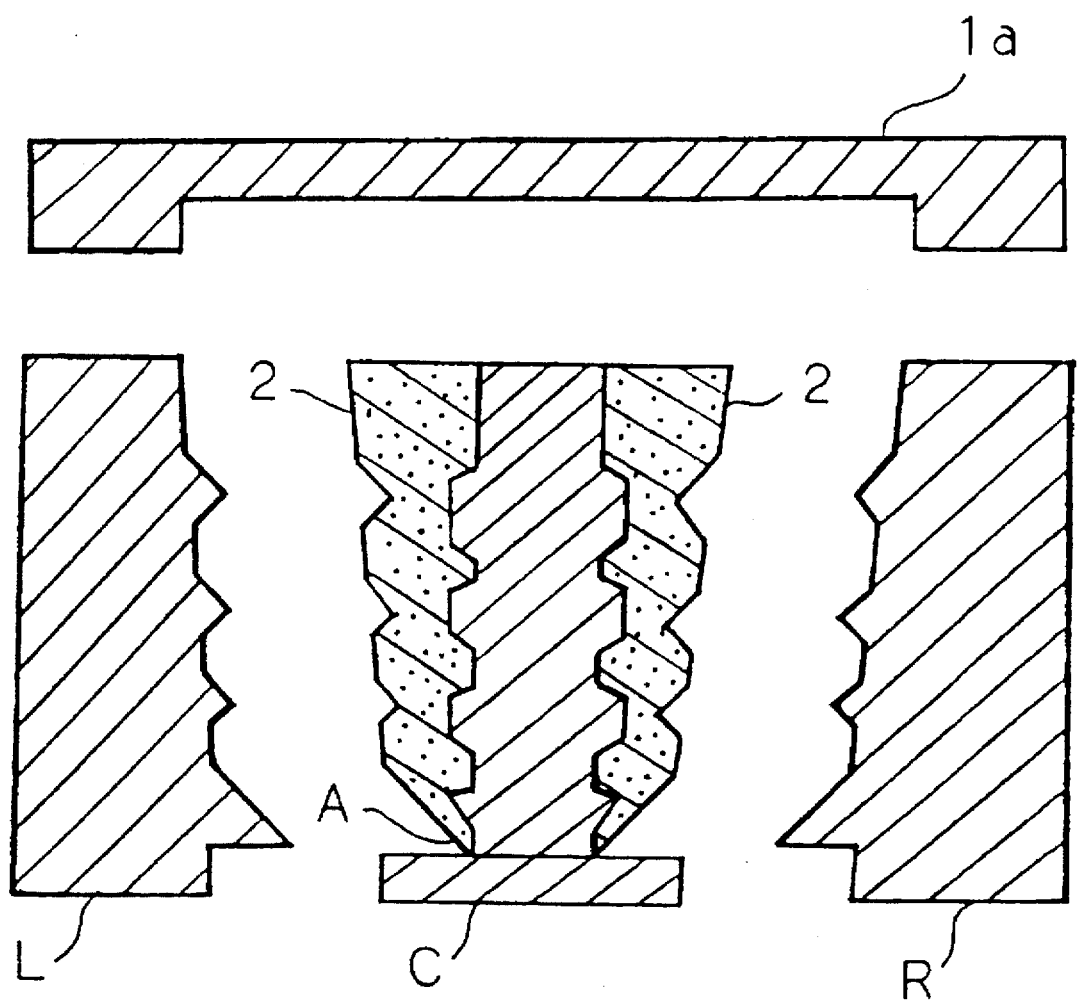
FIG. 2 is a cross section of the mold and the molded article of FIG. 1 in the mode of demolding.

The mold shown in FIG. 1 consists of an upper lid 1a and a lower mold 1b which is split into three parts as shown in FIG. 2. Demolding is conducted first removing the upper mold, then releasing the left side (L) and the right side (R) from the molded article, and pulling the molded article upward from the central part (C) of the mold. Because the cavity wall shown by A in FIGS. 1 and 2 is reverse tapered for the demolding direction, an elastomer with inferior physical properties would fail to stand the pulling stress at the time of demolding and thus cause cracks. The longitudinal dimension of the molded article was 80.5 mm.

(2) Blisters:

Immediately after demolding, the longitudinal dimension of the molded article was measured with a slide gauge. If the dimension was longer than 80.5 mm, the article was regarded to have suffered from blisters.

(III) Composition for Elastomer

Compositions for elastomers used in Examples 1 to 4 and Comparative Examples 1 and 2 are shown in Table 1. Compositions for elastomers used in Examples 5 to 10 are shown in Table 2, in which both polyester polyols (a) and (b) are of condensation type. Those used in Examples 11 to 15 are shown in Table 3, in which a condensation type polyester polyol, a non-condensation type polyester polyol, and a polyether polyol are appropriately polymerized for the preparation of an NCO-terminated prepolymer or an OH-terminated prepolymer. Compositions for elastomers used in Comparative Examples 3 to 5 are shown in Table 4. In the Tables, the proportions of all the components are expressed in terms of part by weight per 100 parts by weight of polyester polyol (a) used for the preparation of an NCO-terminated prepolymer. The proportion in the parentheses in the "Low-molecular weight polyol" line is the one calculated taking the sum of polyester polyol (a) and MDI as 100 parts by weight.

TABLE 1

|  | Example 1 | Example 2 | Example 3 | Example 4 | Compara. Example 1 | Compara. Example 2 |
|---|---|---|---|---|---|---|
| NCO-Terminated Prepolymer: | | | | | | |
| Polyester polyol (1) | 100 | — | 100 | — | 100 | 100 |
| Polyester polyol (2) | — | 100 | — | — | — | — |
| Polyester polyol (3) | — | — | — | 100 | — | — |
| Polyisocyanate (1) | 35 | 35 | 35 | 50 | 35 | — |
| Polyisocyanate (2) | — | — | — | — | — | 24 |
| Terminal NCO content (%) | 5.6 | 5.6 | 5.6 | 5.6 | 5.6 | 4.4 |
| OH-Terminated Prepolymer: | | | | | | |
| OH-Terminated prepolymer (1) | 0.44 | — | — | — | — | — |
| OH-Terminated prepolymer (2) | — | 0.44 | — | — | — | — |
| OH-Terminated prepolymer (3) | — | — | 0.44 | — | — | — |
| OH-Terminated prepolymer (4) | — | — | — | 0.33 | — | — |
| Foaming Component: | | | | | | |
| Blowing agent | 2.95 | 2.95 | 2.95 | 3.27 | 2.95 | 2.13 |
| Catalyst | 0.015 | 0.015 | 0.015 | 0.016 | 0.010 | 0.005 |
| Foam stabilizer | 0.30 | 0.30 | 0.30 | 0.33 | 0.29 | — |

TABLE 2

|  | Example 5 | Example 6 | Example 7 | Example 8 | Example 9 | Example 10 |
|---|---|---|---|---|---|---|
| NCO-Terminated Prepolymer: | | | | | | |
| Polyester polyol (1) | 100 | 100 | 100 | 100 | — | — |
| Polyester polyol (2) | — | — | — | — | 100 | 100 |
| Polyisocyanate (1) | 35 | 35 | 35 | 35 | 35 | 35 |
| Low-molecular weight polyol (1) | 0.5 (0.37) | 1.9 (1.41) | 0.5 (0.37) | 0.5 (0.37) | — | 0.5 (0.37) |
| Low-molecular weight polyol (2) | — | — | — | — | 0.7 (0.52) | — |
| Terminal NCO content (%) | 5.06 | 3.62 | 5.06 | 5.06 | 5.06 | 5.06 |
| OH-Terminated Prepolymer: | | | | | | |
| OH-Terminated prepolymer (1) | 0.44 | — | 0.80 | — | 0.44 | — |
| OH-Terminated prepolymer (2) | — | 0.31 | — | 0.44 | — | 0.44 |
| Foaming Component: | | | | | | |
| Blowing agent | 2.71 | 1.92 | 2.71 | 2.71 | 2.71 | 2.71 |
| Catalyst | 0.01 | 0.008 | 0.01 | 0.01 | 0.01 | 0.01 |
| Foam stabilizer | 0.27 | 0.27 | 0.27 | 0.27 | 0.27 | 0.27 |

TABLE 3

|  | Example 11 | Example 12 | Example 13 | Example 14 | Example 15 |
|---|---|---|---|---|---|
| NCO-Terminated Prepolymer: | | | | | |
| Polyester polyol (1) | 100 | — | — | — | — |
| Polyester polyol (2) | — | 100 | — | — | — |
| Polyester polyol (4) | — | — | 100 | — | — |
| Polyester polyol (5) | — | — | — | 100 | 100 |
| Polyisocyanate (1) | 35 | 35 | 35 | 35 | 35 |
| Low-molecular weight polyol (1) | — | 0.5 (0.37) | 0.5 (0.37) | — | — |
| Low-molecular weight polyol (2) | 0.7 (0.52) | — | — | 0.7 (0.52) | 0.7 (0.52) |
| Terminal NCO content (%) | 5.06 | 5.06 | 5.06 | 5.06 | 5.06 |
| OH-Terminated Prepolymer: | | | | | |
| OH-Terminated prepolymer (1) | — | — | 0.44 | — | — |
| OH-Terminated prepolymer (2) | — | — | — | 0.44 | — |
| OH-Terminated prepolymer (5) | — | 0.44 | — | — | — |
| OH-Terminated prepolymer (6) | — | — | — | — | 0.44 |
| OH-Terminated prepolymer (7) | 0.44 | — | — | — | — |

TABLE 3-continued

|  | Example 11 | Example 12 | Example 13 | Example 14 | Example 15 |
|---|---|---|---|---|---|
| Foaming Component: |  |  |  |  |  |
| Blowing agent | 2.71 | 2.71 | 2.71 | 2.71 | 2.71 |
| Catalyst | 0.01 | 0.01 | 0.01 | 0.01 | 0.01 |
| Foam stabilizer | 0.27 | 0.27 | 0.27 | 0.27 | 0.27 |

TABLE 4

|  | Compara. Example 3 | Compara. Example 4 | Compara. Example 5 |
|---|---|---|---|
| NCO-Terminated Prepolymer: |  |  |  |
| Polyester polyol (1) | 100 | 100 | 100 |
| Polyisocyanate (1) | 35 | 35 | — |
| Polyisocyanate (2) | — | — | 24 |
| Low-molecular weight polyol (1) | — | 0.5 (0.37) | — |
| Terminal NCO content (%) | 5.60 | 5.06 | 4.40 |
| OH-Terminated Prepolymer: | — | — | — |
| Foaming Component: |  |  |  |
| Blowing agent | 2.95 | 2.71 | 2.13 |
| Catalyst | 0.01 | 0.01 | 0.005 |
| Foam stabilizer | 0.29 | 0.27 | — | blowing agent (f), catalyst (g), and foam stabilizer (h)) having been preheated to a temperature of from 40° C. to 70° C. were mixed together at such a mixing ratio that the ratio of the isocyanate equivalent of the NCO-terminated prepolymer to the total hydroxyl equivalent of the OH-terminated prepolymer and the foaming component was 1.1. After stirring, the mixture was cast into a mold to obtain a polyurethane elastomer having a relatively low foaming rate.

The physical properties of the elastomer obtained were measured according to the above-mentioned methods. The results obtained are shown in Table 5.

TABLE 5

|  | Example 1 | Example 2 | Example 3 | Example 4 | Compara. Example 1 | Compara. Example 2 |
|---|---|---|---|---|---|---|
| Density (g/cm$^3$) | 0.55 | 0.55 | 0.55 | 0.55 | 0.55 | 0.50 |
| Tensile strength (MPa) | 6.5 | 6.5 | 6.0 | 6.0 | 6.0 | 6.5 |
| Elongation at break (%) | 400 | 400 | 400 | 350 | 400 | 350 |
| Tear strength (kN/m) | 30 | 35 | 35 | 30 | 30 | 35 |
| Viscosity of prepolymer (cp) | 2,200 | 2,400 | 2,200 | 1,800 | 2,200 | 4,000 |
| Durability: |  |  |  |  |  |  |
| Fatigue life | 500,000 | 500,000 | 500,000 | 500,000 | 100,000 | 500,000 |
| Permanent set (%) | 5 | 6 | 5 | 6 | — | 5 |

EXAMPLES 1 TO 4 AND COMPARATIVE EXAMPLES 1 AND 2

The polyester polyol (a) and polyisocyanate shown in Table 1 were charged in a reactor and reacted at a reactor temperature of from 100° C. to 140° C. for 1 to 2 hours under a nitrogen atmosphere to obtained an NCO-terminated prepolymer, with the polyester polyol (a) having been preheated to a temperature of from 100° C. to 140° C. and the polyisocyanate having been preheated to a temperature of from 70° C. to 110° C.

Separately, the OH-terminated prepolymer shown in Table 1 was prepared from the respective starting materials described in (I-e) above in the same manner as described above.

The OH-terminated prepolymer having been preheated to a temperature of from 40° C. to 70° C., the NCO-terminated prepolymer having been preheated to a temperature of from 70° C. to 110° C., and the foaming component (mixture of As can be seen from the results in Table 5, the elastomers obtained by using an OH-terminated prepolymer and a foaming component containing water as a main blowing agent (Examples 1 to 4) exhibit high tensile strength and high tear strength and undergo no fatigue failure even after 500,000 cycles of repeated loading, only showing permanent set of about 5 to 6%, irrespective of the kind of the polyester polyol used in the preparation of the OH-terminated prepolymer. The NCO-terminated prepolymers used in Examples 1 to 4 had a viscosity falling within the range between 1,800 cp and 2,400 cp, which range is easy for handling.

In Comparative Example 1 wherein the elastomer was prepared in the same manner as in Example 1 except that an OH-terminated prepolymer was not used, the tensile strength and tear strength of the elastomer and the viscosity of the NCO-terminated prepolymer were substantially equal to those obtained in Examples 1 to 4. However, the test piece of Comparative Example 1 underwent a fatigue failure on repetition of loading 100,000 cycles (the permanent set was unmeasurable). In Comparative Example 2 in which NDI was used as a polyisocyanate for polymerization of an NCO-terminated prepolymer, although the elastomer obtained was excellent in mechanical strength and durability equally to those obtained in Examples, this technique is very disadvantageous in that the viscosity of the NCO-terminated prepolymer was about double that of the NCO-terminated prepolymer of each Example.

EXAMPLES 5 TO 15 AND COMPARATIVE EXAMPLES 3 TO 5

The polyester polyol and polyisocyanate shown in Tables 2, 3, and 4 were charged in a reactor and reacted for 1 to 2 hours under a nitrogen atmosphere, with the polyester polyol having been preheated to a temperature of from 100° C. to 140° C. and the polyisocyanate having been preheated to a temperature of from 70° C. to 110° C. The low-molecular weight polyol shown in the Tables was added to the reaction product, followed by allowing the mixture to react while stirring to prepare an NCO-terminated prepolymer. In Comparative Examples 3 and 5, a low-molecular weight polyol was not added.

In Examples 5 to 15, the OH-terminated prepolymer shown in the Tables was prepared from the respective starting materials described in (I-e) above in the same manner as described above.

The OH-terminated prepolymer having been preheated to a temperature of from 40° C. to 70° C., the NCO-terminated prepolymer having been preheated to a temperature of from 70° C. to 110° C., and the blowing component having been preheated to a temperature of from 40° C. to 70° C. were mixed together at such a mixing ratio that the ratio of the isocyanate equivalent of the NCO-terminated prepolymer to the total hydroxyl equivalent of the OH-terminated prepolymer and the foaming component was 1.1. After stirring, the mixture was cast into a mold to obtain a polyurethane elastomer having a relatively low foaming rate. In Comparative Examples, no OH-terminated prepolymer was used.

The physical properties of the elastomer obtained were measured according to the above-mentioned methods. The results obtained are shown in Tables 6 to 8.

TABLE 6

|  | Example 5 | Example 6 | Example 7 | Example 8 | Example 9 | Example 10 |
| --- | --- | --- | --- | --- | --- | --- |
| Density (g/cm$^3$) | 0.55 | 0.55 | 0.55 | 0.55 | 0.55 | 0.55 |
| Tensile strength (MPa) | 6.5 | 6.5 | 6.0 | 6.5 | 6.5 | 6.0 |
| Elongation at break (%) | 400 | 350 | 400 | 350 | 400 | 400 |
| Tear strength (kN/m) | 35 | 30 | 35 | 35 | 30 | 35 |
| Durability: |  |  |  |  |  |  |
| Fatigue life | 500,000 | 500,000 | 500,000 | 500,000 | 500,000 | 500,000 |
| Permanent set (%) | 5 | 6 | 6 | 5 | 5 | 5 |
| Prepolymer pot life (hr) | 6 | 6 | 6 | 6 | 6 | 6 |

TABLE 7

|  | Example 11 | Example 12 | Example 13 | Example 14 | Example 15 |
| --- | --- | --- | --- | --- | --- |
| Density (g/cm$^3$) | 0.55 | 0.55 | 0.55 | 0.55 | 0.55 |
| Tensile strength (MPa) | 6.5 | 6.5 | 6.0 | 6.5 | 6.5 |
| Elongation at break (%) | 400 | 350 | 400 | 350 | 400 |
| Tear strength (kN/m) | 35 | 35 | 30 | 35 | 35 |
| Durability |  |  |  |  |  |
| Fatigue life | 500,000 | 500,000 | 500,000 | 500,000 | 500,000 |
| Permanent set (%) | 6 | 5 | 5 | 6 | 5 |
| Prepolymer pot life (hr) | 6 | 6 | 6 | 6 | 6 |

TABLE 8

|  | Compara. Example 3 | Compara. Example 4 | Compara. Example 5 |
| --- | --- | --- | --- |
| Density (g/cm$^3$) | 0.55 | 0.55 | 0.50 |
| Tensile strength (MPa) | 6.0 | 6.0 | 6.5 |
| Elongation at break (%) | 400 | 400 | 350 |
| Tear strength (kN/m) | 30 | 35 | 35 |
| Durability: |  |  |  |
| Fatigue life | 100,000 | 400,000 | 500,000 |
| Permanent set (%) | — | — | 5 |
| Prepolymer pot life (hr.) | 6 | 6 | 3 |

As can be seen from the results in Tables 6 and 7, the elastomers of Examples 5 to 15, in which NCO-terminated prepolymer (B) obtained by reacting a reaction product of polyester polyol (a) and pure MDI with a low-molecular weight polyol before addition of a foaming component and OH-terminated prepolymer (B) were used, exhibit excellent tensile and tear strength. Even after 500,000 cycles of repeated loading, these elastomers showed no fatigue failure, only having permanent set as small as 5 to 6%. Further, the pot life of the NCO-terminated prepolymer (B) was as long as 6 hours in each Example. These effects were independent of the kinds or amounts of the low-molecular weight polyol, polyester polyol (a), and OH-terminated prepolymer (B) used.

To the contrary, as shown in Table 8 the elastomer of Comparative Example 3, which was prepared in the same manner as in Example 5 except for using neither low-molecular weight polyol nor OH-terminated prepolymer, developed a fatigue failure on repetition of loading 100,000 cycles (permanent set was unmeasurable), proving inferior in durability, although equal to the elastomers of Examples in tensile and tear strength and NCO-terminated prepolymer pot life.

The elastomer of Comparative Example 4, which was prepared in the same manner as in Example 5 except for using no OH-terminated prepolymer, developed a fatigue failure after 400,000 cycles of repeated loading, proving slightly inferior in durability, although equal to the elastomers of Examples in physical properties and NCO-terminated prepolymer pot life.

The elastomer of Comparative Example 5, which was prepared in the same manner as in Comparative Example 3 but using NDI in place of MDI, equaled those of Examples in mechanical characteristics and durability but proved inferior in that the pot life of the NCO-terminated prepolymer was 3 hours, a half of that of those used in Examples.

The first embodiment of the present invention retains the advantage of using MDI as a component for preparing an NCO-terminated prepolymer, i.e., the advantage that the resulting NCO-terminated prepolymer has a low viscosity and is easy to handle, while reducing the disadvantage conventionally associated with the use of MDI in terms of fatigue properties or deformation properties in a fatigue test under high load, thereby providing a microcellular polyurethane elastomer equal in durability to those obtained by using NDI as a polyisocyanate.

In the above embodiment, where TODI is used as a polyisocyanate component for the preparation of an OH-terminated prepolymer, the resulting microcellular polyurethane elastomer has further improved durability. In a preferred embodiment according to the above-described first embodiment, the NCO-terminated prepolymer has a viscosity of not higher than 2,500 cp and is therefore excellent in workability in the preparation of the elastomer, and the microcellular polyurethane elastomer has a fatigue life of 500,000 or more and permanent set of not greater than 10% in a fatigue test.

The fifth embodiment of the present invention retains the advantage of the use of MDI as a polyisocyanate component for the preparation of an NCO-terminated prepolymer, i.e., the advantage that the resulting NCO-terminated prepolymer has a long pot life, while reducing the disadvantage conventionally associated with the use of MDI in terms of fatigue properties or deformation properties in a fatigue test under high load, thereby providing a microcellular polyurethane elastomer equal in durability to those obtained by using NDI as a polyisocyanate.

In the fifth embodiment, where TODI is used as a polyisocyanate component for preparing the OH-terminated prepolymer, the resulting microcellular polyurethane elastomer has further improved durability. Further, where the NCO-terminated prepolymer is used in a specific ratio, the durability of the resulting elastomer can further be ensured.

In a preferred embodiment according to the fifth embodiment, there are provided an elastomer having a fatigue life of 500,000 or more and permanent set of not greater than 10% in a fatigue test. In another preferred embodiment of the fifth embodiment, the NCO-terminated prepolymer used has a pot life of 4 hours or longer and is therefore excellent in workability.

According to the process of the present invention, a microcellular polyurethane elastomer having excellent characteristics as described above can be obtained by using a specific NCO-terminated prepolymer with its structure partially crosslinked by a low-molecular weight polyol, an OH-terminated prepolymer, and a foaming component.

While the invention has been described in detail and with reference to specific examples thereof, it will be apparent to one skilled in the art that various changes and modifications can be made therein without departing from the spirit and scope thereof.

What is claimed is:

1. A microcellular polyurethane elastomer obtained by mixing an isocyanate-terminated prepolymer, a hydroxyl-terminated prepolymer and a foaming component with stirring to cause foaming and curing, in which said isocyanate-terminated prepolymer is a prepolymer obtained by reacting a polyester polyol having a number average molecular weight of 1,000 to 3,000 and pure diphenylmethane-4,4'-diisocyanate at a weight ratio of from 1:0.2 to 0.6, said hydroxyl-terminated prepolymer is a prepolymer obtained by reacting a polyester polyol having a number average molecular weight of 1,000 to 3,000 with 3,3'-dimethyl-4,4'biphenylene diisocyanate at a molar ratio of from 1:0.05 to 0.5, and said foaming component contains water as a main blowing agent.

2. A microcellular polyurethane elastomer as claimed in claim 1, wherein said hydroxyl-terminated prepolymer is used in an amount of from 0.1 to 1.0 part by weight per 100 parts by weight of the polyester polyol used for obtaining the isocyanate-terminated prepolymer.

3. A microcellular polyurethane elastomer as claimed in claim 1, wherein said isocyanate-terminated prepolymer has a viscosity of not higher than 2,500 cp as measured with a Brookfield rotational viscometer at a rotor rotation speed of 30 rpm and a measuring temperature of 80° C. using a No. 3 rotor, and said microcellular polyurethane elastomer exhibits a fatigue life of not less than 500,000 and permanent set of not more than 10% in a fatigue test in which a load of 5 kN is repeatedly applied to a test piece at a frequency of 2 Hz, the fatigue life being the number of cycles of repeated loading required for a break, and the permanent set (S) being obtained by equation:

$$S(\%)=(h_0-h)/h_0\times 100$$

wherein $h_0$ is the height of a test piece before a fatigue test; and h is the height of the test piece after 500,000 cycles of repeated loading in the test.

4. A microcellular polyurethane elastomer obtained by mixing an isocyanate-terminated prepolymer, an hydroxyl-terminated prepolymer and a foaming component with stirring to cause foaming and curing, in which said isocyanate-terminated prepolymer is a prepolymer obtained by reacting a polyester polyol having a number average molecular weight of 1,000 to 3,000 and pure diphenylmethane-4,4'-diisocyanate at a weight ratio of from 1:0.2 to 0.6, and reacting 100 parts by weight of the resulting reaction product with from 0.1 to 2.0 parts by weight of a low-molecular weight polyol, said hydroxyl-terminated prepolymer is a prepolymer obtained by reacting a polyester polyol and/or a polyether polyol both having a number average molecular weight of 500 to 3,000 with dimethyl-4,4'biphenylene diisocyanate at a molar ratio of from 1:0.05 to 0.5, and said foaming component contains water as a main blowing agent.

5. A microcellular polyurethane elastomer as claimed in claim 4, wherein said hydroxyl-terminated prepolymer is used in an amount of from 0.1 to 1.0 part by weight per 100 parts by weight of the polyester polyol used for obtaining the isocyanate-terminated prepolymer.

6. A microcellular polyurethane elastomer as claimed in claim 4, wherein said microcellular polyurethane elastomer exhibits a fatigue life of not less than 500,000 and permanent set of not more than 10% in a fatigue test in which a load of 5 kN is repeatedly applied to a test piece at a frequency of 2 Hz, the fatigue life being the number of cycles of repeated loading required for a break, and the permanent set (S) being obtained by equation:

$$S(\%) = (h_0 - h)/h_0 \times 100$$

wherein $h_0$ is the height of a test piece before a fatigue test; and h is the height of the test piece after 500,000 cycles of repeated loading in the test.

7. A microcellular polyurethane elastomer as claimed in claim 4, wherein said isocyanate-terminated prepolymer has a pot life of 4 hours or longer, the pot life being defined as the limit of time until which non-defective elastomers could be obtained without suffering from abnormality, such as cracks or blisters, at the time of demolding.

* * * * *